(12) United States Patent
Zheng (10) Patent No.: US 9,701,332 B2
(45) Date of Patent: Jul. 11, 2017

(54) STROLLER FRAME ASSEMBLY

(71) Applicant: Wonderland Nurserygoods Company Limited, N.T., Hong Kong (HK)

(72) Inventor: Lei-Lei Zheng, Guangdong (CN)

(73) Assignee: WONDERLAND NURSERYGOOD COMPANY LIMITED, Hong Kong (HK)

( * ) Notice: Subject to any disclaimer, the term of this patent is extended or adjusted under 35 U.S.C. 154(b) by 0 days.

(21) Appl. No.: 14/729,219

(22) Filed: Jun. 3, 2015

(65) Prior Publication Data

US 2015/0353115 A1 Dec. 10, 2015

(30) Foreign Application Priority Data

Jun. 6, 2014 (CN) .......................... 2014 1 0250637

(51) Int. Cl.
| | |
|---|---|
| *B62B 7/06* | (2006.01) |
| *B62B 7/00* | (2006.01) |
| *B62B 9/20* | (2006.01) |
| *B62B 7/08* | (2006.01) |

(52) U.S. Cl.
CPC ................ *B62B 7/06* (2013.01); *B62B 7/006* (2013.01); *B62B 7/062* (2013.01); *B62B 7/068* (2013.01); *B62B 7/08* (2013.01); *B62B 9/203* (2013.01); *B62B 2205/20* (2013.01); *B62B 2205/22* (2013.01)

(58) Field of Classification Search
CPC .. B62B 9/203; B62B 9/20; B62B 7/06; B62B 7/006; B62B 7/062; B62B 7/068
See application file for complete search history.

(56) References Cited

U.S. PATENT DOCUMENTS

| | | | | |
|---|---|---|---|---|
| 8,210,563 | B2 * | 7/2012 | Dotsey ...................... | B62B 7/08 280/47.371 |
| 8,894,090 | B1 * | 11/2014 | Chen ....................... | B62B 7/086 280/47.38 |
| 2006/0237949 | A1 * | 10/2006 | Hou .......................... | B62B 7/08 280/642 |
| 2010/0156060 | A1 | 6/2010 | Dotsey et al. | |
| 2010/0194065 | A1 * | 8/2010 | Mountz ..................... | B62B 9/20 280/47.36 |
| 2011/0148059 | A1 * | 6/2011 | Li ........................... | B62B 9/203 280/47.36 |
| 2011/0248477 | A1 * | 10/2011 | Chen ........................ | B62B 7/10 280/647 |
| 2011/0291388 | A1 * | 12/2011 | Sellers ..................... | B62B 7/08 280/647 |

FOREIGN PATENT DOCUMENTS

| | | |
|---|---|---|
| EP | 1238887 A2 | 9/2002 |
| EP | 2527228 A1 | 11/2012 |
| GB | 2482246 A | 1/2012 |

* cited by examiner

*Primary Examiner* — Brian Swenson
(74) *Attorney, Agent, or Firm* — Hamre, Schumann, Mueller & Larson, P.C.

(57) ABSTRACT

A stroller frame assembly includes: front and rear leg units; an armrest; a seat support bar disposed below and opposing the armrest; and first and second connecting bars. The first connecting bar cooperates with the armrest, the seat support bar and the front leg unit to form a first four-bar linkage mechanism. The first connecting bar cooperates with the armrest, the second connecting bar and the rear leg unit to form a second four-bar linkage mechanism.

12 Claims, 13 Drawing Sheets

STROLLER FRAME ASSEMBLY

CROSS-REFERENCE TO RELATED APPLICATION

This application claims priority of Chinese Application No. 201410250637.6, filed on Jun. 6, 2014.

FIELD

The disclosure relates to a stroller frame assembly, more particularly to a stroller frame assembly including first and second four-bar linkage mechanisms.

BACKGROUND

A conventional stroller may include a stroller frame, a seat mounted on the stroller frame, and a handle pivoted to the stroller frame, such that the handle may be disposed at a front angular position, in which the user can face a baby lying or sitting on the seat while holding or pushing the handle to move the stroller, or a rear angular position, in which the user is behind the baby while holding or pushing the handle. The conventional stroller may be foldable for storage or transport purposes. However, it can only be folded in one way, that is, the handle needs to be placed at the rear angular position so that the stroller can be folded.

SUMMARY

An object of the disclosure is to provide a stroller frame assembly that may overcome the aforesaid drawback associated with the prior art.

According to one aspect of the disclosure, there is provided a stroller frame assembly that includes: front and rear leg units; an armrest; a seat support bar disposed below and opposing the armrest; and first and second connecting bars. The first connecting bar cooperates with the armrest, the seat support bar and the front leg unit to form a first four-bar linkage mechanism. The first connecting bar cooperates with the armrest, the second connecting bar and the rear leg unit to form a second four-bar linkage mechanism.

According to another aspect of the disclosure, there is provided a stroller frame assembly that includes: a frame body; a handle pivoted to the frame body so as to be pivotable relative to the frame body between a frontward facing position and a rearward facing position; a handle pivoted to the frame body so as to be pivotable relative to the frame body between a frontward facing position and a rearward facing position; a locking member operable to lock the frame body against folding; and first, second and third engaging members. The first engaging member is mounted on the handle. The second and third engaging members are connected to the frame body. The first and second engaging members engage each other to position the handle at the frontward facing position. The first and third engaging members engage each other to position the handle at the rearward facing position. The frame body is foldable upon release from the locking unit either when the handle is disposed at the frontward facing position or the rearward facing position. The first engaging member is driven to slide on the handle along the length of the handle by the frame body upon folding of the frame body when the handle is disposed at one of the frontward and rearward facing positions.

BRIEF DESCRIPTION OF THE DRAWINGS

In drawings which illustrate an embodiment of the disclosure.

DETAILED DESCRIPTION

Figure 1:
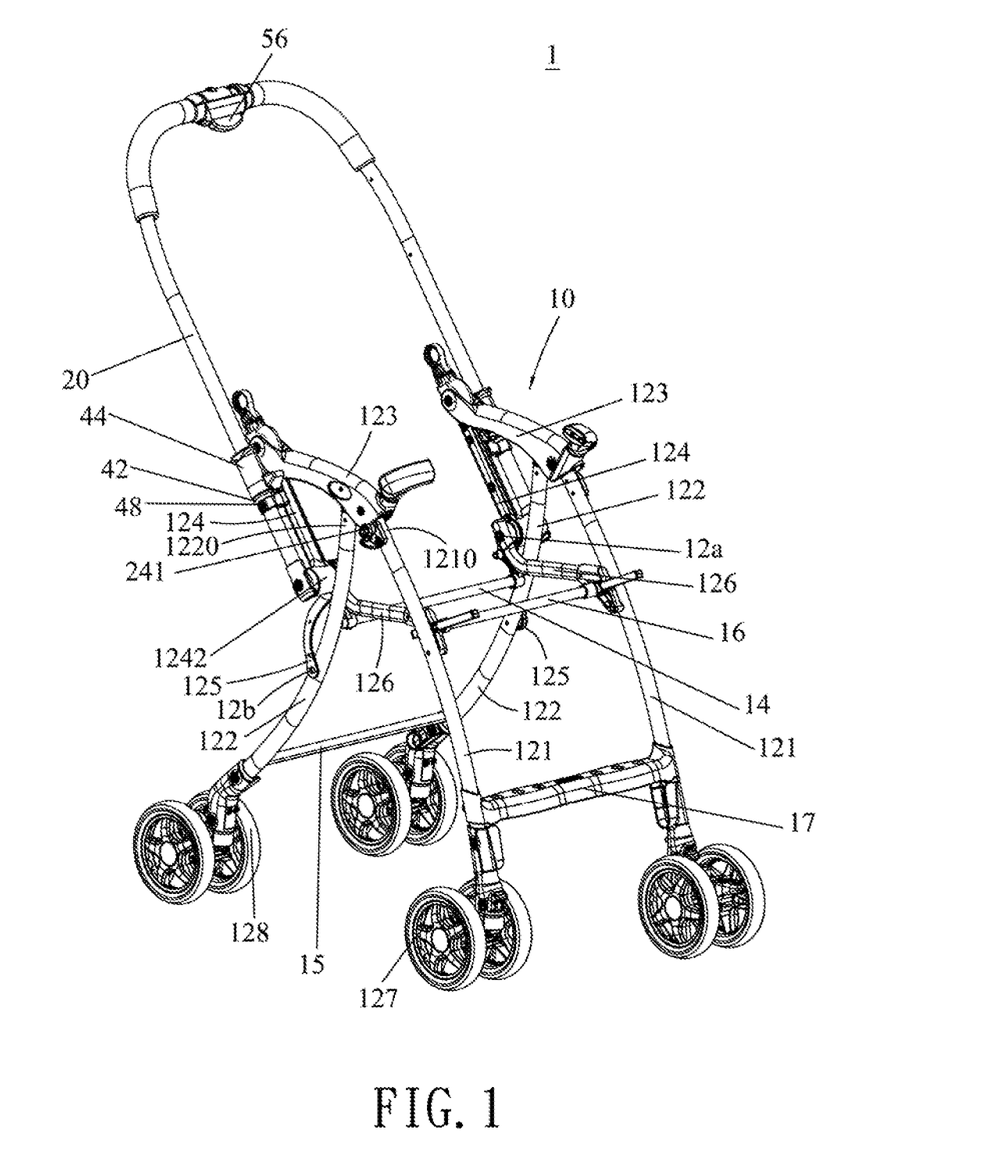
FIG. 1 is a perspective view of the embodiment of a stroller frame assembly according to the disclosure.
Figure 2:
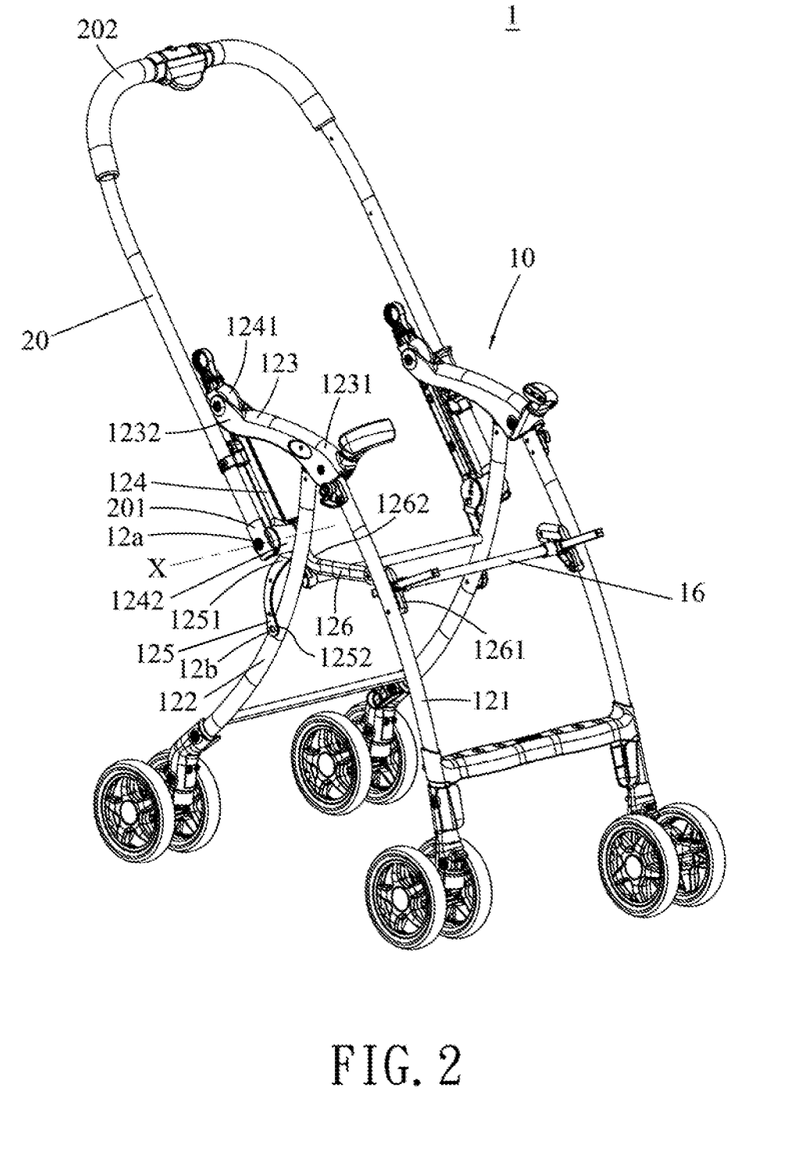
FIG. 2 is a partly perspective view of the embodiment.

FIGS. 1 and 2 illustrate the embodiment of a stroller frame assembly 1 according to the disclosure. The stroller frame assembly 1 includes a frame body 10, front wheels 127, rear wheels 128, a handle 20, a first locking unit, a second locking unit, a third locking unit, and an unlocking unit. The frame body 10 includes a front leg unit, a rear leg unit, two armrests 123, two first connecting bars 124, two second connecting bars 125, and a seat support having two seat support bars 126.

The front leg unit includes two front legs 121 and upper and lower crossbars 16, 17 interconnecting the front legs 121. The seat support bars 126 are pivoted to the upper crossbar 16 of the front leg unit. The rear leg unit includes two rear legs 122 and upper and lower crossbars 14, 15. The lower crossbar 15 of the rear leg unit interconnects the rear legs 122. The upper crossbar 14 of the rear leg unit is transverse and pivoted to the first connecting bars 124. The seat support bars 126 cooperate with the upper crossbar 16 of the front leg unit to support a seat (not shown) thereon.

Each of the front and rear leg units has a top end portion 1210, 1220. The front wheels 127 are connected to the front leg unit. The rear wheels 128 are connected to the rear leg unit.

Since the parts of the frame body at one side of the stroller frame assembly 1 are symmetrical and similar to those at the other side of the stroller frame assembly 1, only the parts, i.e., the armrest 123, the first connecting bar 124, the second connecting bar 125, the seat support bar 126, at one side of the stroller frame assembly 1 are described herein in detail for the sake of brevity.

The seat support bar 126 has hollow front and rear end portions 1261, 1262, and is disposed below and opposes the armrest 123. The armrest 123 has front and rear end portions 1231, 1232. The handle 20 has a hollow end portion 201 and an operating segment 202 opposite to the end portion 201.

The first connecting bar 124 has hollow upper and lower end portions 1241, 1242, is disposed rearward of the rear leg 122 of the rear leg unit, and opposes the front leg 121 of the front leg unit. The second connecting bar 125 has first and second end portions 1251, 1252. The lower end portion 1242 of the first connecting bar 124 is cylindrical in shape, and defines a central axis (X) that is perpendicular to the length of the first connecting bar 124.

In this embodiment, the lower end portion 1242 of the first connecting bar 124, the first end portion 1251 of the second connecting bar 125, the lower end portion 201 of the handle 20 and the rear end portion 1262 of the seat support bar 126 are pivoted on a first pivot 12a, so that each of the handle 20, the first and second connecting bars 124, 125 and the seat support bar 126 is rotatable about the first pivot 12a. The first pivot 12a extends along the central axis (X) through the lower end portion 1242 of the first connecting bar 124, the first end portion 1251 of the second connecting bar 125, the lower end portion 201 of the handle 20 and the rear end portion 1262 of the seat support bar 126. The front end portion 1261 of the seat support bar 126 is indirectly pivoted to the front leg 121 by pivoting to the upper crossbar 16 of the front leg unit. The rear end portion 1232 of the armrest 123 is pivoted to the upper end portion 1241 of the first connecting bar 124. The top end portions 1210, 1220 of the front and rear leg units are pivoted to the front end portion 1231 of the armrest 123. The second end portion 1252 of the second connecting bar 125 is pivoted to the rear leg 122 of the rear leg unit through a second pivot 12b that is parallel to the first pivot 12a. As such, the first connecting bar 124, the armrest 123, the seat support bar 126 and the front leg 121 of the front leg unit cooperate one another to form a first four-bar linkage mechanism 91 (see FIG. 5), and the first connecting bar 124, the armrest 123, the second connecting bar 125 and the rear leg 122 of the rear leg unit cooperate one another to form a second four-bar linkage mechanism 92 (see FIG. 5). The first and second four-bar linkage mechanisms 91, 92 are operatively associated with each other.

Figure 5:
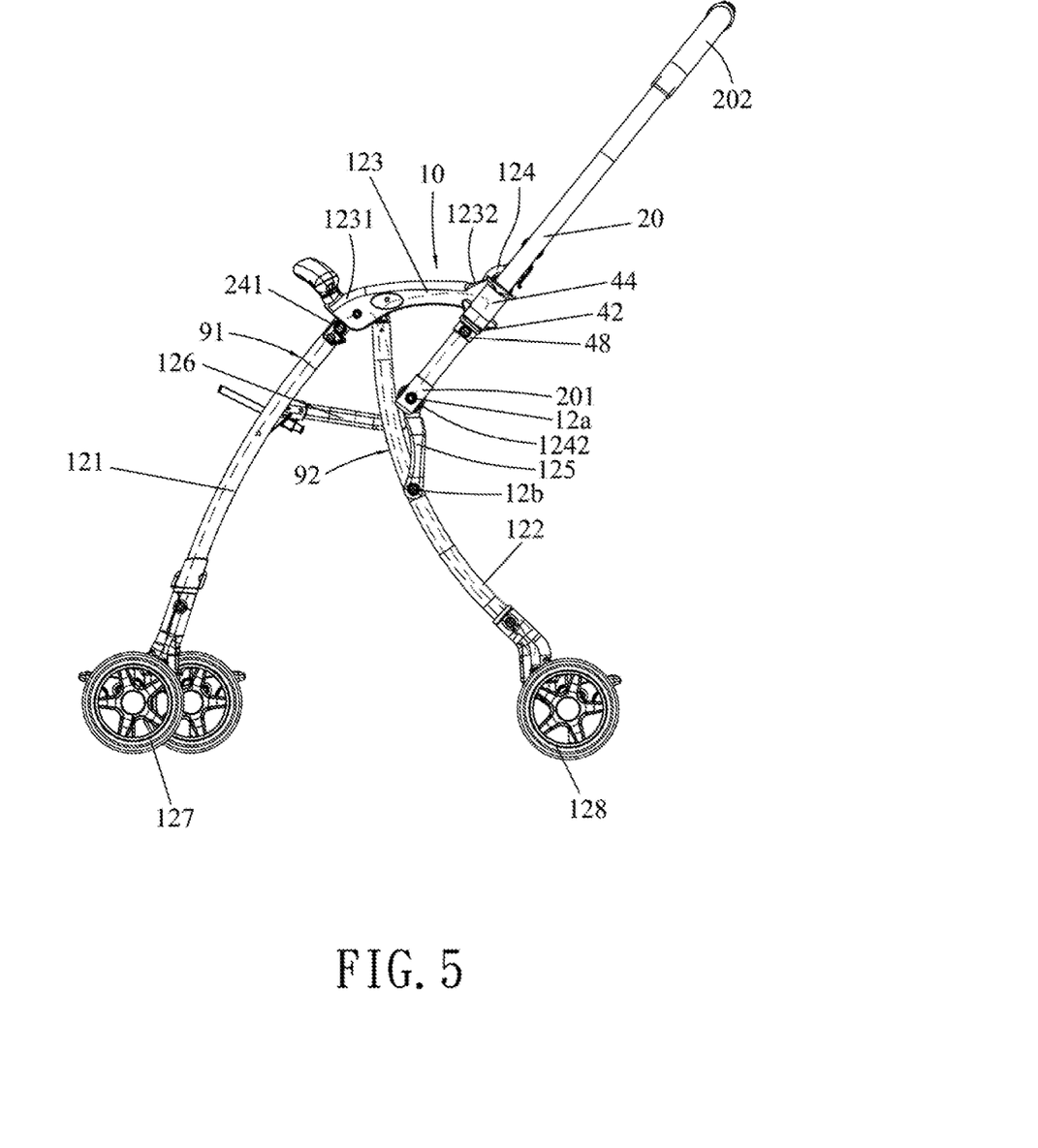
FIG. 5 is a schematic view illustrating a condition where the embodiment is disposed at a first non-folded state.
Figure 7:
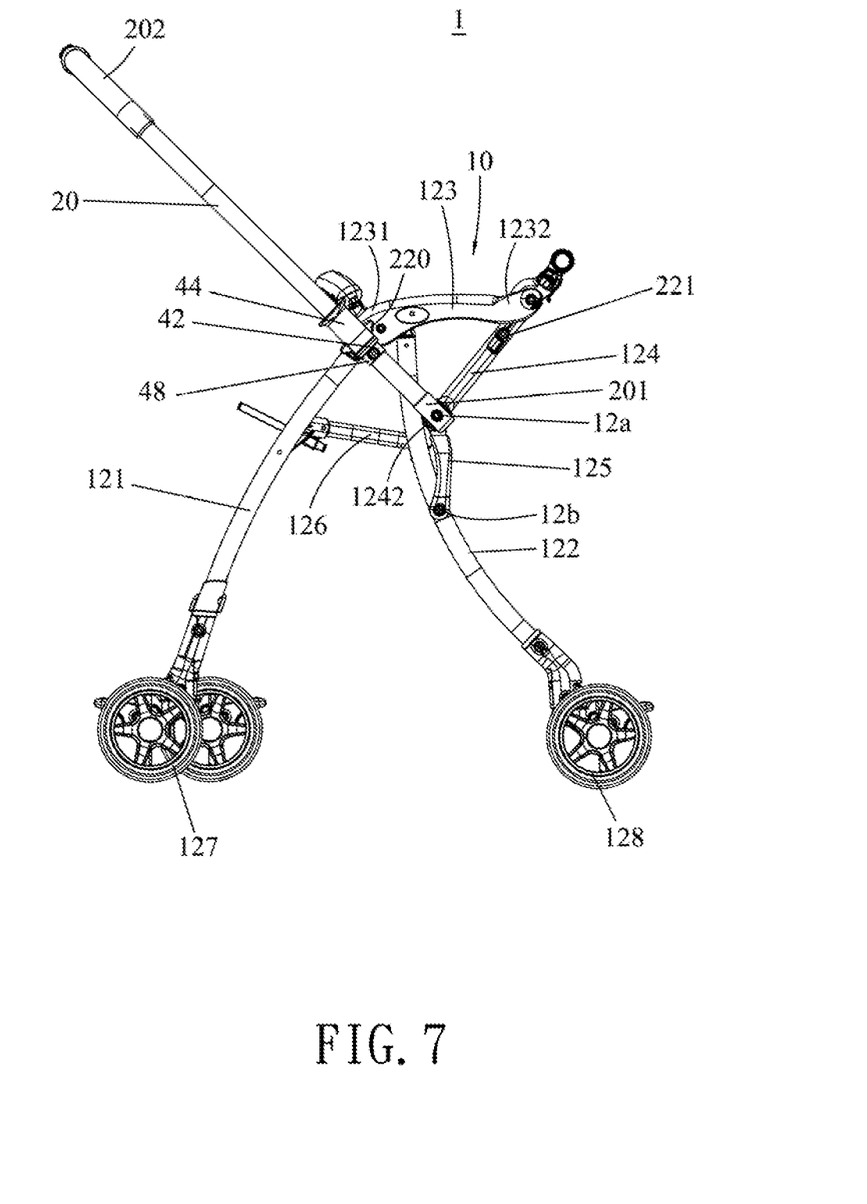
FIG. 7 is a schematic view illustrating a condition where the embodiment is disposed at a second non-folded state.

The handle 20 is rotatable relative to the first and second connecting bars 124, 125 about the first pivot 12a between frontward and rearward facing positions (see FIGS. 5 and 7). The operating segment 202 is disposed rearwardly of the rear end portion 1232 of the armrest 123 when the handle 20 is disposed at the frontward facing position, and is disposed frontwardly of the front end portion 1231 of the armrest 123 when the handle 20 is disposed at the rearward facing position.

Figure 6:
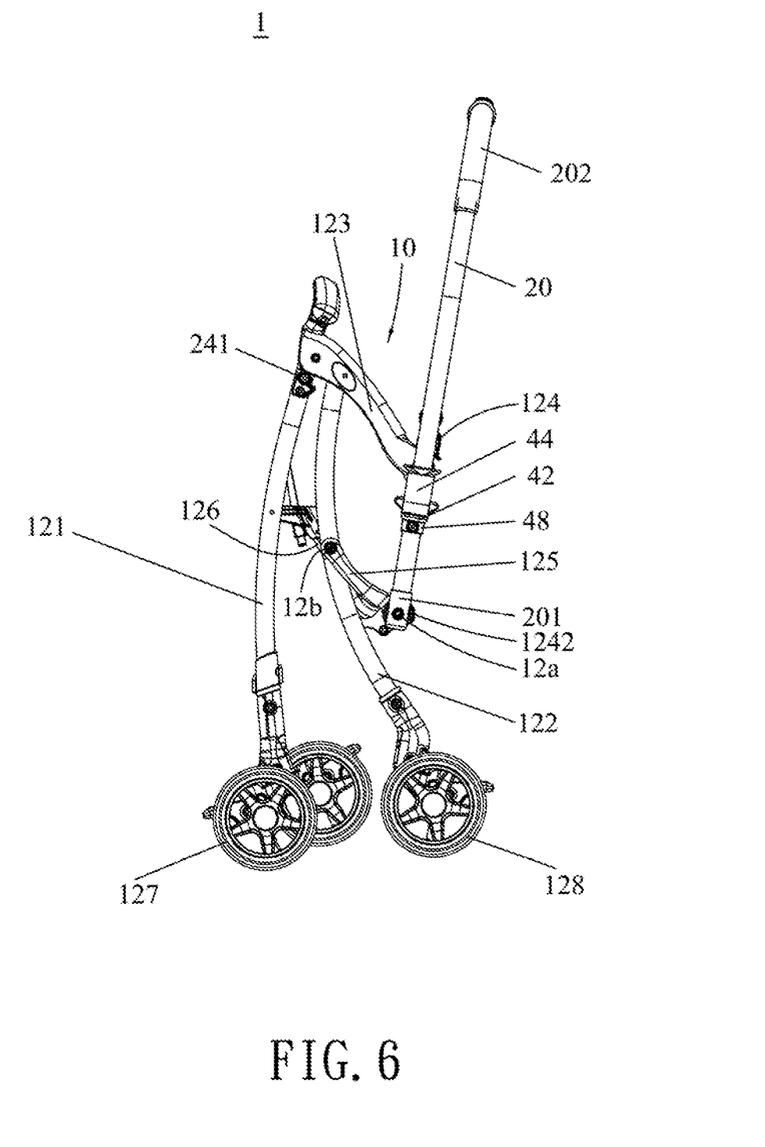
FIG. 6 is a schematic view illustrating a condition where the embodiment is disposed at a first folded state.

The associated first and second four-bar linkage mechanisms 91, 92 permit the stroller frame assembly 1 to be foldable in two different conditions. In one condition, when the handle 20 is disposed at the frontward facing position, the stroller frame assembly 1 can be folded from a first non-folded state (see FIG. 5) to a first folded state (see FIG. 6). In the other condition, when the handle 20 is disposed at the rearward facing position, the stroller frame assembly 1 can be folded from a second non-folded state (see FIG. 7) to a second folded state (see FIG. 8). The first pivot 12a is disposed above the second pivot 12b when the stroller frame assembly 1 is disposed at either the first non-folded state or the second non-folded state, and is disposed below the second pivot 12b when the stroller frame assembly 1 is disposed at either the first folded state or the second folded state. The handle 20 and the first connecting bar 124 overlap each other in a direction parallel to the central axis (X) (or to the first and second pivots 12a, 12b) when the stroller frame assembly 1 is disposed at either the first non-folded state or the first folded state. The handle 20 and the first connecting bar 124 cooperatively form an angle (or a V-shaped structure) when the stroller frame assembly 1 is disposed at either the second non-folded state or the second folded state. The angle is gradually reduced when the stroller frame assembly 1 is being folded.

The second locking unit includes first and second locking members 32, 34 (see FIGS. 3 and 4) which are respectively provided on the first and second connecting bars 124, 125 and which releasably engage each other so as to lock the first connecting bar 124 against rotation relative to the second connecting bar 125, thereby preventing the stroller frame assembly 1 from being folded either when the stroller frame assembly 1 is disposed at the first non-folded state or the second non-folded state.

Figure 3:
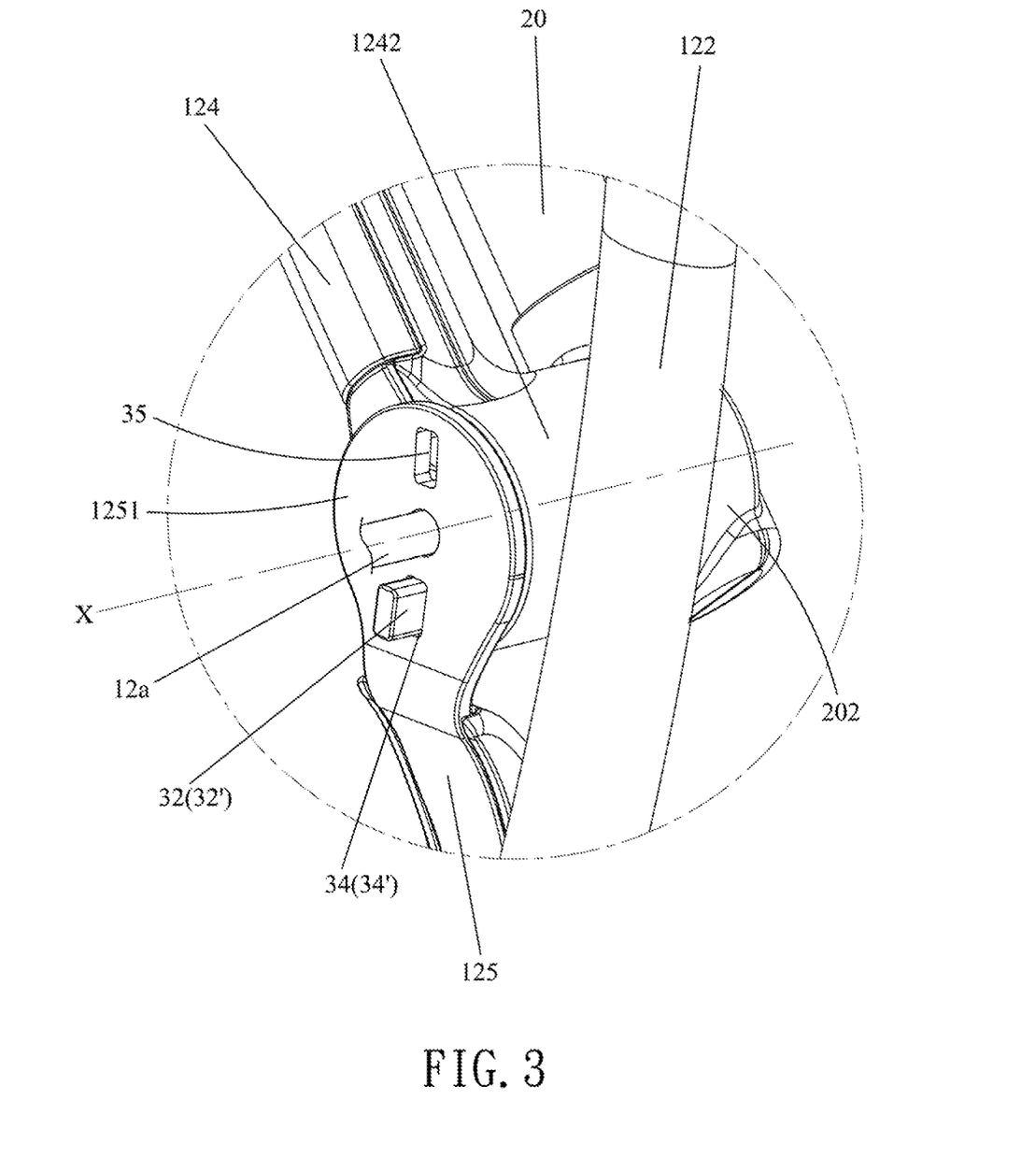
FIG. 3 is a fragmentary perspective view of the embodiment.
Figure 4:
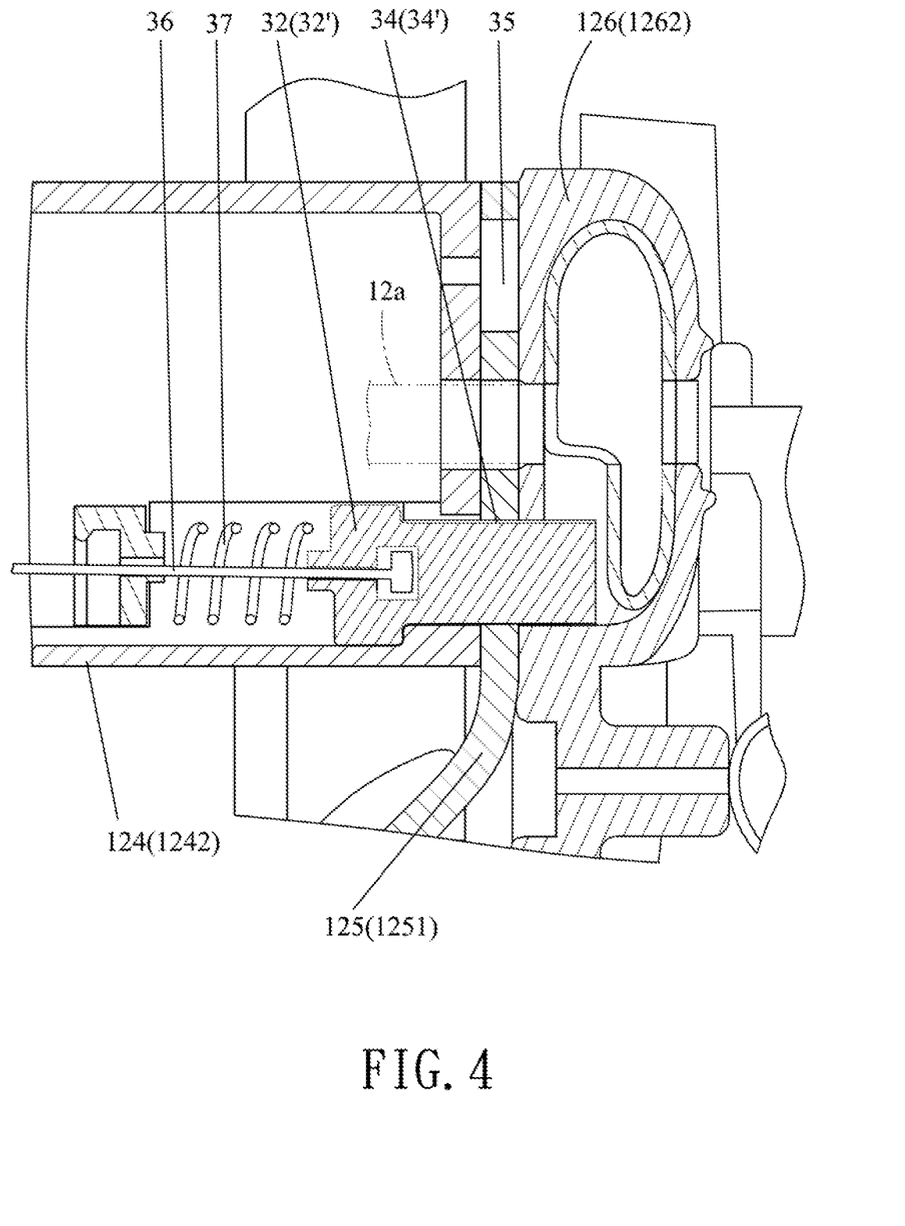
FIG. 4 is a fragmentary sectional view of the embodiment.

In this embodiment, the first locking member 32 is a first latch bar (32') that is mounted movably on the first connecting bar 124. The first end portion 1251 of the second connecting bar 125 has a first locking hole 34' defining the second locking member 34. The first latch bar 32' is operable to move into and out of the first locking hole 34'. In particular, the first latch bar 32' is mounted movably in the hollow end portion 1242 of the first connecting bar 124, is movable relative to the first connecting bar 124 in a direction parallel to the central axis (X) and transverse to the length of the first connecting bar 124, and extends through the first locking hole 34' into the rear end portion 1262 of the seat support bar 126 to engage releasably the seat support bar 126 so as to lock the seat support bar 126 against rotation about the first pivot 12a. The first latch bar 32' is urged by a spring 37.

Figure 9:
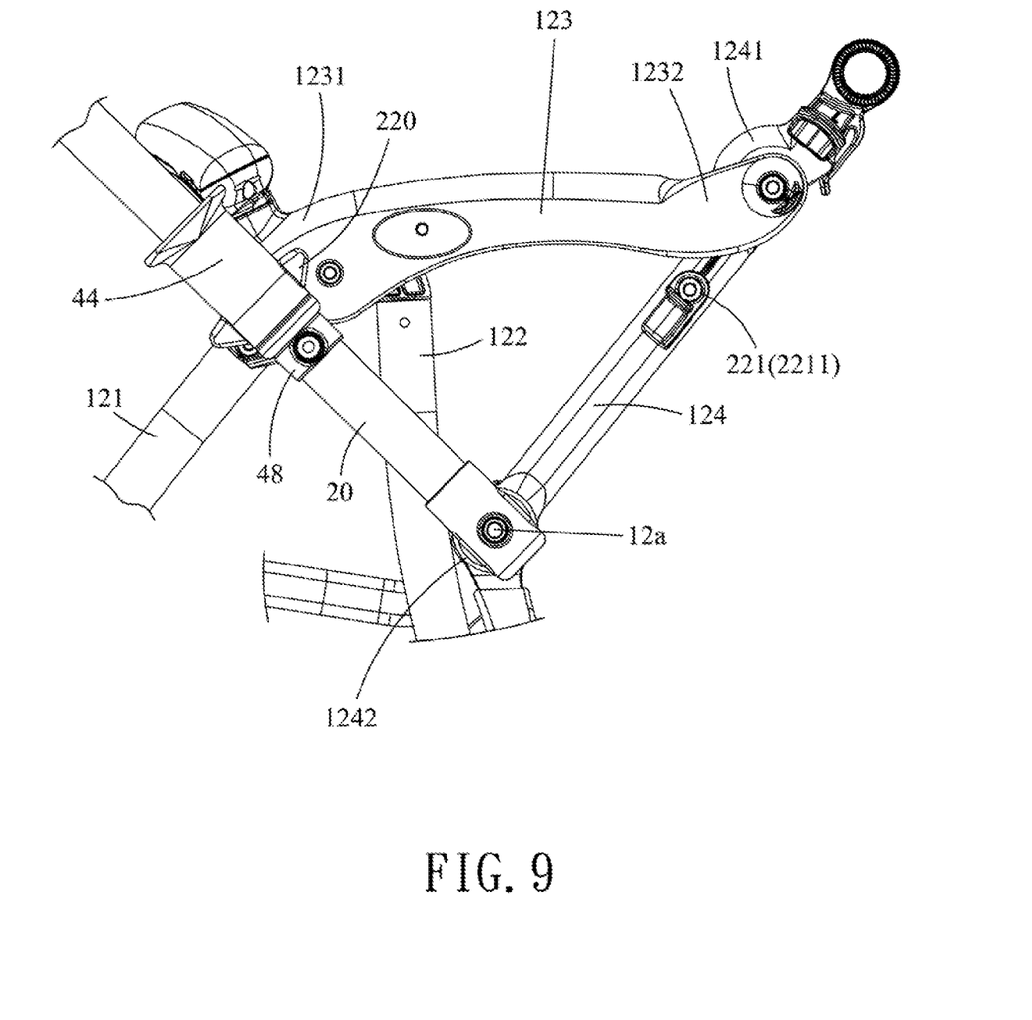
FIG. 9 is a fragmentary schematic view of the embodiment.
Figure 10:
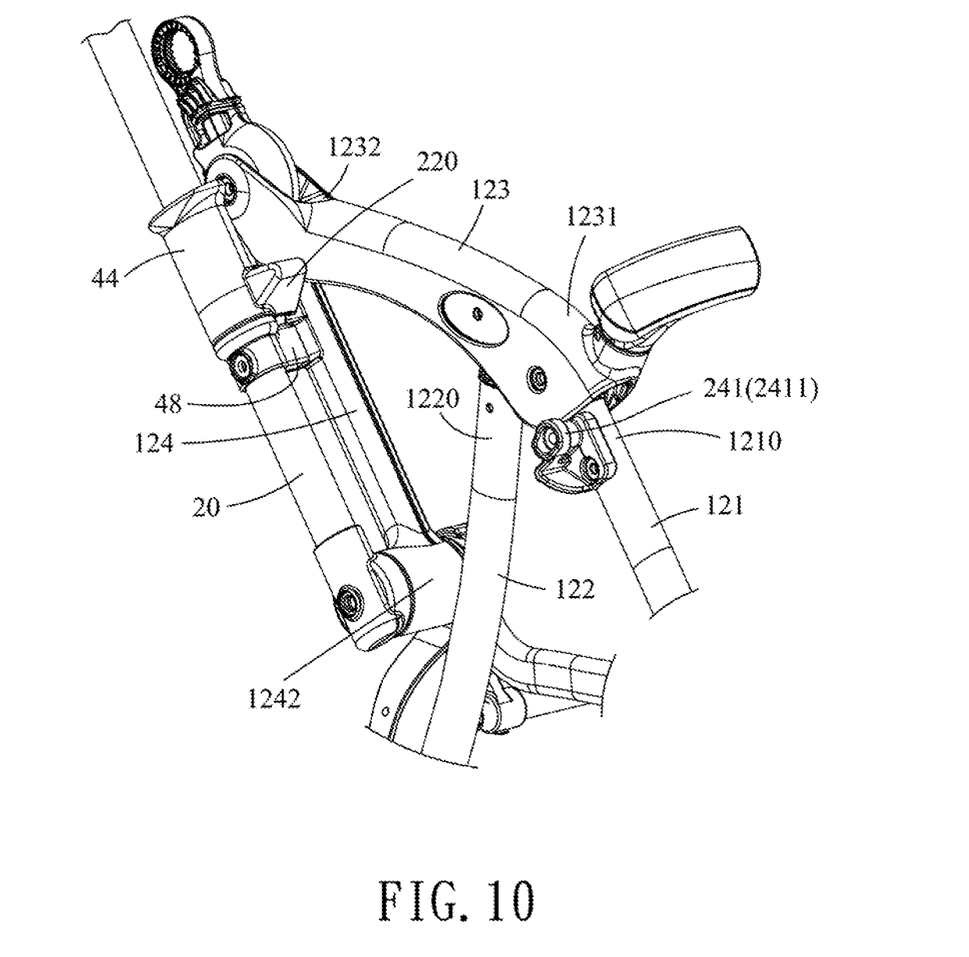
FIG. 10 is another fragmentary perspective view of the embodiment.
Figure 11:
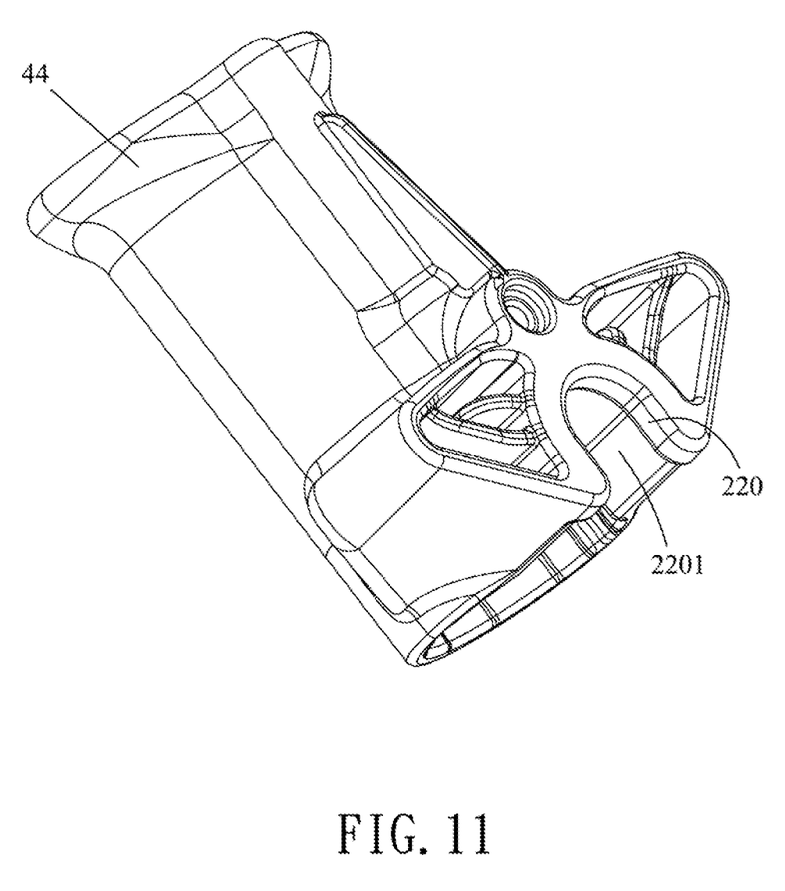
FIG. 11 is a perspective view of a first engaging member of the embodiment.

Referring to FIGS. 9 to 11, the first locking unit includes a first engaging member 220, a second engaging member 221 and a third engaging member 241. The first engaging member 220 is connected to the handle 20 through a lock-releasing sleeve 44. The second engaging member 221 is connected to the first connecting bar 124. The first and second engaging members 220, 221 releasably engage each other so as to position the handle 20 at the frontward facing position. The third engaging member 241 is connected to a top end of the front leg 121 of the front leg unit (i.e., the top end portion 1210 of the front leg unit), and releasably engages the first engaging member 220 so as to position the handle 20 at the rearward facing position. Alternatively, the third engaging member 241 may be connected to the front end portion 231 of the armrest 23 or the top end portion 1220 of the rear leg unit. The first engaging member 220 is formed with an open groove 2201. Each of the second and third engaging members 221, 241 has a tongue 2211, 2411 that engages the open groove 2201 in a tongue-and-groove engaging manner.

The lock-releasing sleeve 44 is slidably mounted on the handle 20. The first and second engaging members 220, 221 protrude respectively and outwardly from the lock-releasing sleeve 44 and the first connecting bar 124. The lock-releasing sleeve 44 is manually operable to slide along the length of the handle 20 between engaging and disengaging positions (not shown) so as to permit the first engaging member 220 to engage and disengage the second engaging member 221 or the third engaging member 241.

Figure 12:
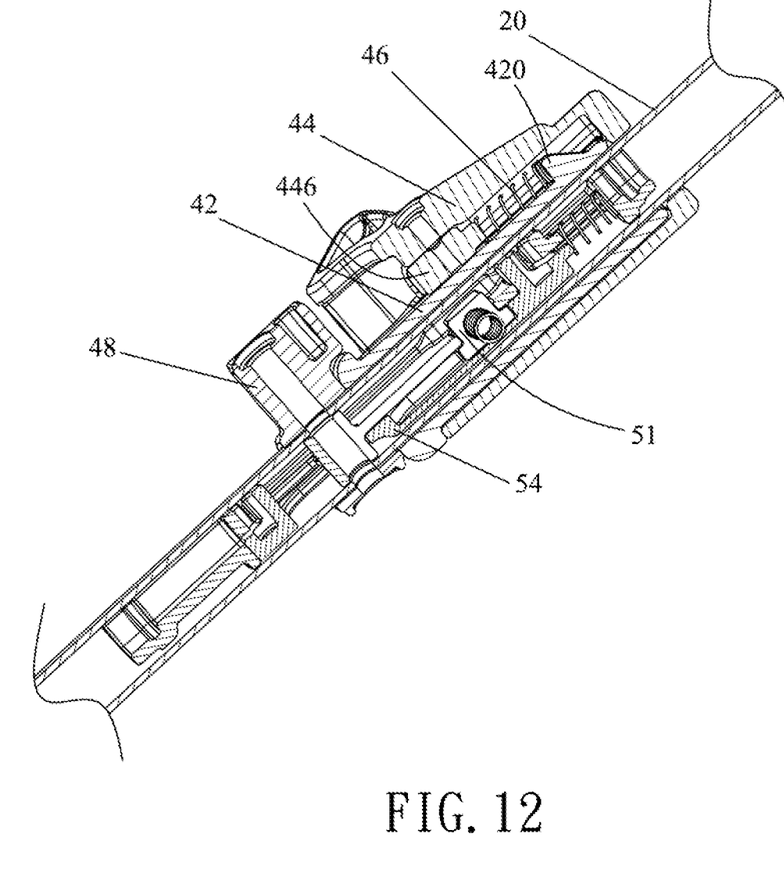
FIG. 12 is another fragmentary sectional view of the embodiment.
Figure 13:
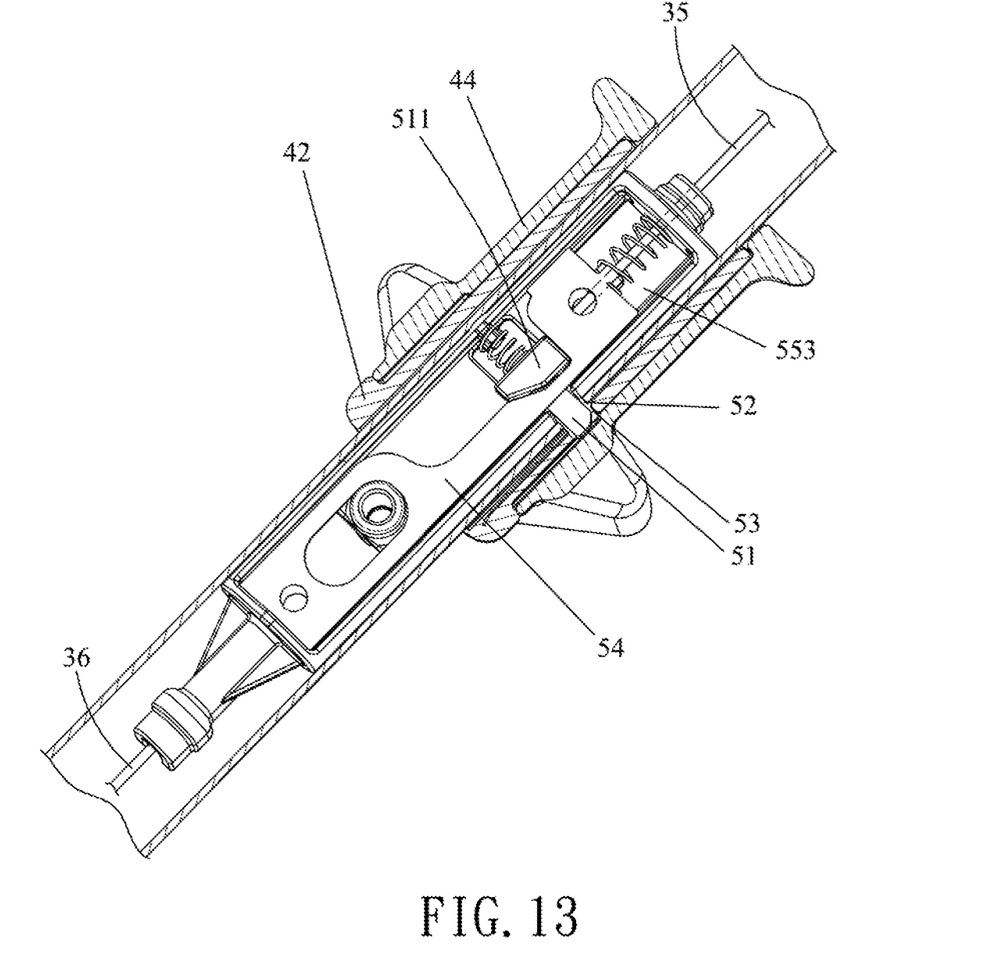
FIG. 13 is a fragmentary cutaway view of the embodiment.

Referring to FIGS. 12 and 13, in combination with FIGS. 1 and 4, the third locking unit includes a second latch bar 51, a second locking hole 52 that is formed in the handle 20, and an inner sleeve 42 that is slidably sleeved on the handle 20 and that is formed with a third locking hole 53. The lock-releasing sleeve 44 is slidably sleeved on the inner sleeve 42. The second latch bar 51 is mounted movably in the handle 20, and extends into the second and third locking holes 52, 53 to lock the inner sleeve 42 against sliding movement on the handle 20. The third locking unit provides a second protection from undesired folding of the stroller frame assembly 1.

The unlocking unit includes a driving cam 54 mounted movably in the handle 20, a cam follower 511 formed on the second latch bar 51 and disposed in the handle 20 to contact the driving cam 54, first and second operating strings 35, 36 connected to the driving cam 54, and an operating knob 56 (see FIG. 1) mounted movably on the handle 20 and connected to the first operating string 35. The second operating string 36 is further connected to the first latch bar 32' (or the first locking member 32).

The unlocking unit serves to unlock the first and second latch bars 32', 51 from the first, second and third locking holes 34', 52, 53. In an unlocking operation, the operating knob 56 is moved to pull the first operating string 35, which results in movement of the second latch bar 51 out of the third locking hole 53 through a cam mechanism between the driving cam 54 and the cam follower 511, thereby unlocking the second latch bar 51 from the third locking hole 53. The movement of the driving cam 54 also results in the movement of the first latch bar 32' out of the first locking hole 34' through the second operating string 36, thereby permitting folding of the stroller frame assembly 1.

Figure 8:
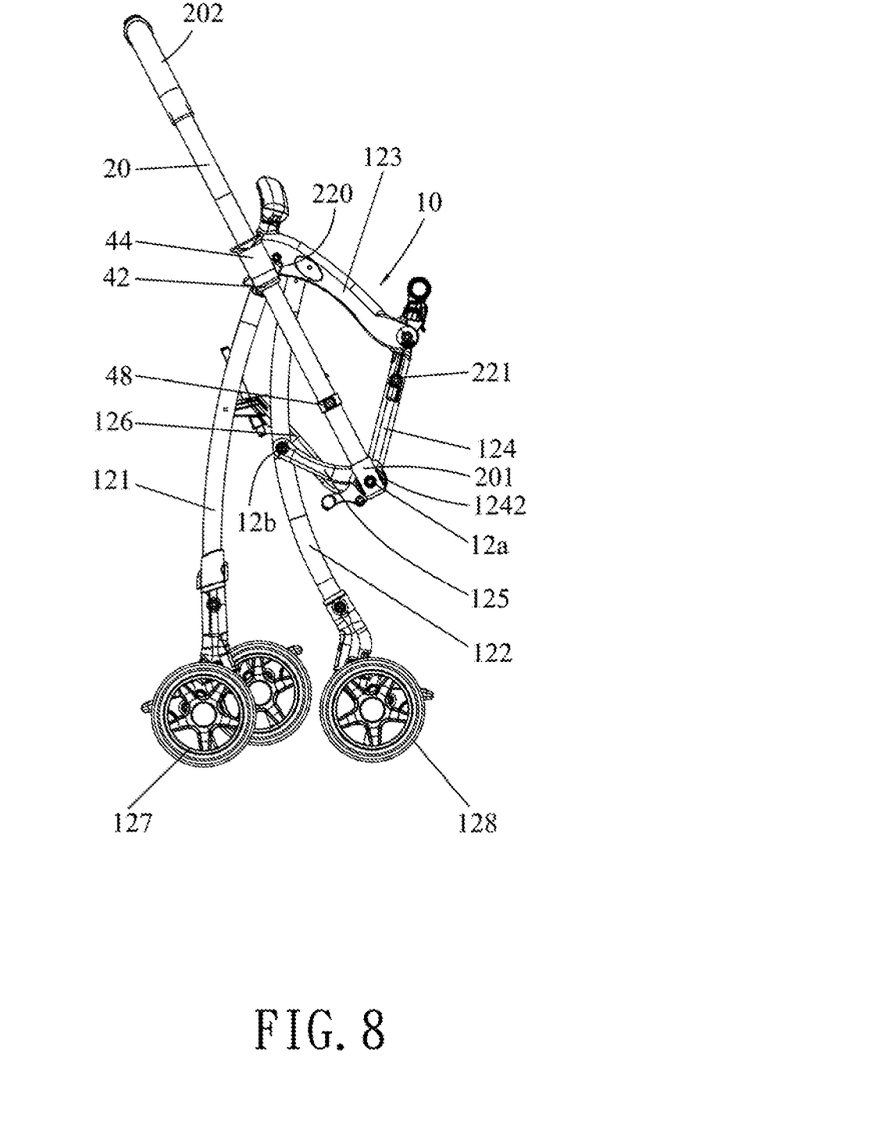
FIG. 8 is a schematic view illustrating a condition where the embodiment is disposed at a second folded state.

It is noted that when the second latch bar 51 is unlocked from the third locking hole 53, the inner sleeve 42 is permitted to slide on the handle 20, which is necessary for folding of the stroller frame assembly 1 when the handle 20 is disposed at the rearward facing position (see FIG. 7). As shown in FIGS. 7 and 8, the distance between the first pivot 12a and the first engaging member 220 is increased after folding of the stroller frame assembly 1 which is disposed at a state where the handle 20 is disposed at the rearward facing position. However, the distance between the first pivot 12a and the first engaging member 220 is not increased after folding of the stroller frame assembly 1 which is disposed at another state where the handle 20 is disposed at the frontward facing position (see FIGS. 5 and 6). It is further noted that the inner sleeve 42 together with the lock-releasing sleeve 44 and the first engaging member 220 is driven to slide on the handle 20 along the length of the handle 20 by the third engaging member 241 on the front leg 121 of the frame body 10 upon folding of the frame body 10 when the handle 20 is disposed at the rearward facing position, and that the inner sleeve 42 together with the lock-releasing sleeve 44 and the first engaging member 220 remains unmoved relative to the handle 20 upon folding of the frame body 10 when the handle 20 is disposed at the frontward facing position.

Referring to FIG. 12, the inner sleeve 42 is further formed with a limiting protrusion 420. A spring seat 446 is disposed between the inner sleeve 42 and the lock-releasing sleeve 44, and is secured to the lock-releasing sleeve 44. An urging member 46, which is in the form of a coil spring, is mounted on the spring seat 446, and abuts against the limiting protrusion 420 and the spring seat 446. When the lock-releasing sleeve 44 is moved on the handle 20 relative to the inner sleeve 42 from the engaging position to the disengaging position (not shown), the spring seat 446 is driven by the lock-releasing sleeve 44 to move against the urging member 46 toward the limiting protrusion 420 and the urging member 46 accumulates a restoring force for restoring the lock-releasing sleeve 44 to the engaging position. The limiting protrusion 420 prevents accidental removal of the lock-releasing sleeve 44 from inner sleeve 42.

Referring to FIGS. 5 to 8, a stopper 48 is secured to the handle 20 at a position such that the second engaging member 221 contacts and is limited by the stopper 48 when the handle 20 is disposed at the frontward facing position and that the third engaging member 241 contacts and is limited by the stopper 43 when the handle 20 is disposed at the rearward facing position. As such, rotation of the handle 20 about the first pivot 12a is limited to a range between the frontward and rearward facing positions. In addition, the stopper 48 can facilitate alignment of the first engaging member 220 with either the second engaging member 221 or the third engaging member 241 when the handle 20 is being moved to either the rearward facing position or the frontward facing position.

With the inclusion of the first and second four-bar linkage mechanisms 91, 92 in the stroller frame assembly 1 of the present disclosure, the aforesaid drawback associated the prior art may be overcome.

While the disclosure has been described in connection with what is considered the exemplary embodiment, it is understood that the disclosure is not limited to the disclosed embodiment but is intended to cover various arrangements included within the spirit and scope of the broadest interpretation and equivalent arrangements.

What is claimed is:

1. A stroller frame assembly comprising:
   a frame body, said frame body including:
      front and rear leg units;
      an armrest;
      a seat support bar disposed below and opposing said armrest; and
      first and second connecting bars,
      wherein said first connecting bar cooperates with said armrest, said seat support bar, and said front leg unit to form a first four-bar linkage mechanism;
      wherein said first connecting bar cooperates with said armrest, said second connecting bar, and said rear leg unit to form a second four-bar linkage mechanism,
   wherein said stroller frame assembly further comprises:
      a handle pivoted to said first connecting bar and pivotable relative to said first and second connecting bars between a frontward facing position and a rearward facing position;
      at least one locking member operable to lock said first connecting bar relative to said second connecting bar;
      a lock-releasing sleeve slidably mounted on said handle; and
      first, second, and third engaging members, said first engaging member being disposed on said lock-releasing sleeve, said second and third engaging members being connected to said frame body, said first and second engaging members releasably engaging each other to position said handle at said frontward facing position, said first and third engaging members releasably engaging each other to position said handle at said rearward facing position,
   wherein said frame body is foldable upon release from said at least one locking member when said handle is disposed at said rearward facing position; and
   wherein said lock-releasing sleeve is driven to slide on said handle along a length of said handle by said frame body upon folding of said frame body when said handle is disposed at said rearward facing position.

2. The stroller frame assembly of claim 1, wherein said handle has an operating segment and an end portion that is pivoted to said first and second connecting bars, said armrest having front and rear end portions, said operating segment being disposed rearwardly of said rear end portion of said armrest when said handle is disposed at said frontward facing position, and being disposed frontwardly of said front end portion of said armrest when said handle is disposed at said rearward facing position.

3. The stroller frame assembly of claim 1, wherein said first and second engaging members protrude respectively and outwardly from said lock-releasing sleeve and said first connecting bar, said lock-releasing sleeve being operable to slide along a length of said handle so as to permit said first engaging member to engage and disengage said second engaging member.

4. The stroller frame assembly of claim 1, wherein said at least one locking member includes first and second locking members which are respectively provided on said first and second connecting bars and which releasably engage each other so as to lock said first connecting bar against rotation relative to said second connecting bar.

5. The stroller frame assembly of claim 4, wherein said first locking member is a first latch bar that is mounted movably on said first connecting bar, said second connecting bar having an end portion that has a first locking hole defining said second locking member, said first latch bar being operable to move into and out of said first locking hole.

6. The stroller frame assembly of claim 5, further comprising a first pivot, said first connecting bar having a hollow end portion, said end portions of said first and second connecting bars being pivoted on said first pivot.

7. The stroller frame assembly of claim 6, wherein said seat support bar has a hollow end portion, said end portion of said handle being hollow, said end portions of said handle and said seat support bar being pivoted on said first pivot.

8. The stroller frame assembly of claim 7, wherein said hollow end portion of said first connecting bar is cylindrical in shape and defines a central axis that is perpendicular to a length of said first connecting bar, said first pivot extending along said central axis through said end portions of said handle, said seat support bar, and said first and second connecting bars.

9. The stroller frame assembly of claim 8, wherein said first latch bar is mounted movably in said hollow end portion of said first connecting bar, and is movable relative to said first connecting bar in a direction parallel to said central axis, said first latch bar extending into said end portion of said seat support bar to engage releasably said seat support bar so as to lock said seat support bar against rotation about said first pivot.

10. The stroller frame assembly of claim 1, wherein said second connecting bar has opposite first and second end portions, said first end portion being pivoted to said first connecting bar through a first pivot, said second end portion being pivoted to said rear leg unit through a second pivot that is parallel to said first pivot.

11. The stroller frame assembly of claim 1, wherein said first connecting bar is disposed rearward of said rear leg unit and opposes said front leg unit, said armrest having front and rear end portions, each of said front and rear leg units having a top end portion, said front end portion of said armrest being pivoted to said top end portions of said front and rear leg units, said rear end portion of said armrest being pivoted to said first connecting bar.

12. The stroller frame assembly of claim 1, further comprising a stopper that is secured to said handle, said third engaging member contacting and being limited by said stopper when said handle is disposed at said rearward facing position, said second engaging member contacting and being limited by said stopper when said handle is disposed at said frontward facing position.

* * * * *